(12) United States Patent
Chen

(10) Patent No.: US 7,789,003 B2
(45) Date of Patent: Sep. 7, 2010

(54) MITER SAW

(75) Inventor: Jung-Huo Chen, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 378 days.

(21) Appl. No.: 11/892,694

(22) Filed: Aug. 27, 2007

(65) Prior Publication Data
US 2008/0053282 A1    Mar. 6, 2008

(30) Foreign Application Priority Data
Aug. 29, 2006   (TW) ............................ 95215302 U

(51) Int. Cl.
  B26D 7/18     (2006.01)
  B27B 5/29     (2006.01)
  B23D 45/04    (2006.01)
(52) U.S. Cl. .................... 83/100; 83/471.3; 83/490; 83/581
(58) Field of Classification Search ............ 83/98, 83/100, 165, 485, 490, 471.3, 486.1, 581; 144/252.1; 451/453, 456; D15/133
See application file for complete search history.

(56) References Cited

U.S. PATENT DOCUMENTS

| | | | |
|---|---|---|---|
| 3,958,474 A * | 5/1976 | Kreitz ........................ | 83/100 |
| 5,063,802 A | 11/1991 | Shiotani et al. | |
| 5,349,752 A | 9/1994 | Stirm | |
| 5,445,056 A | 8/1995 | Folci | |
| 5,537,748 A | 7/1996 | Takahashi et al. | |
| 5,782,153 A | 7/1998 | Sasaki et al. | |
| 5,819,619 A | 10/1998 | Miller et al. | |
| D407,094 S | 3/1999 | Meredith et al. | |
| 5,927,171 A | 7/1999 | Sasaki et al. | |
| 5,931,072 A | 8/1999 | Shibata | |
| D435,259 S | 12/2000 | Brickner, Jr. et al. | |
| 6,219,922 B1 | 4/2001 | Campbell et al. | |
| 6,427,570 B1 | 8/2002 | Miller et al. | |
| 6,431,040 B1 | 8/2002 | Miller et al. | |
| 6,470,778 B1 * | 10/2002 | Kaye et al. ..................... | 83/100 |
| 6,510,772 B2 | 1/2003 | Brickner, Jr. et al. | |
| 6,742,425 B2 | 6/2004 | Oktavec et al. | |
| 6,988,435 B2 | 1/2006 | Kao | |
| 7,069,831 B2 * | 7/2006 | Chang ........................ | 83/100 |
| 7,222,560 B2 | 5/2007 | Parks et al. | |
| 2004/0060405 A1 * | 4/2004 | Kao ............................ | 83/100 |

(Continued)

FOREIGN PATENT DOCUMENTS

CN    101164727    *    4/2008

(Continued)

*Primary Examiner*—Laura M. Lee
(74) *Attorney, Agent, or Firm*—Bacon & Thomas, PLLC

(57) ABSTRACT

A saw having a table assembly, a pivot arm, a saw blade and a dust collection system. The table assembly includes a workpiece support surface upon which a workpiece can be supported. The pivot arm is pivotally mounted to the table assembly, and includes a driver and a dust collection passage. The saw blade is mounted on the pivot arm and is driven by the driver for cutting the workpiece. The dust collection system includes a groove having one end which connects to the table assembly, and another end extending to the dust collection passage. Sawdust and/or chips generated during the cutting operation are transferred to the dust collection passage along the groove and are discharged out of the saw.

20 Claims, 7 Drawing Sheets

U.S. PATENT DOCUMENTS

| | | |
|---|---|---|
| 2004/0089125 A1 | 5/2004 | Schoene et al. |
| 2005/0092150 A1* | 5/2005 | Liao .............................. 83/100 |
| 2005/0262978 A1 | 12/2005 | Hetcher et al. |
| 2006/0037453 A1* | 2/2006 | Chang ......................... 83/490 |
| 2006/0107810 A1 | 5/2006 | Chiu |
| 2006/0230898 A1 | 10/2006 | Brunson et al. |

FOREIGN PATENT DOCUMENTS

| | | |
|---|---|---|
| JP | 2003-251624 | 9/2003 |
| TW | 408643 | 10/2000 |

* cited by examiner

MITER SAW

BACKGROUND

1. Field of the Invention

The present invention relates to a saw and more particularly, to a saw having a dust collection system.

2. Description of the Related Art

Referring to FIGS. 8 and 9, a miter saw 80 having a dust collection system typically includes a table assembly 81, a pivot arm 82 which is pivotally mounted to the table assembly 81, a driver 83 mounted on the pivot arm 82, and a saw blade 84 driven by the driver 83 to rotate. When a user wants to execute a cut on a workpiece (not shown) disposed upon the table assembly 81, the user firstly empowers the driver 83 to rotate the saw blade 84, and secondly rotates the pivot arm 82 downward toward the table assembly 81, such that the saw blade 84 is conducted downward toward the table assembly 81 and cuts through the workpiece.

A dust collection passage 85 is formed within the pivot arm 82 and is located adjacent to where the pivot arm 82 is pivotally mounted to the table assembly 81. An inlet 852 of the dust collection passage 85 is located in an extended position along a tangent line in the direction L of where the saw blade 84 rotates out of the workpiece. An outlet (not shown) of the dust collection passage 85 then is designed to be attached a dust bag 86 or a vacuum (not shown). During a cutting operation, sawdust or chips of the workpiece cut by the saw blade 84 are propelled to enter the inlet 852 of the dust collection passage 85 by the centrifugal force and the airflow generated by the rotating saw blade 84. Thus, the sawdust and/or chips enter the dust bag 86 through the dust collection passage 85. By this way, the miter saw 80 can achieve the goal of collecting sawdust and/or chips through the dust collection passage 85.

However, there is an open area P between the inlet 852 of the dust collection passage 85 and where the saw blade 84 rotates out of the workpiece. The airflow generated by the rotating saw blade 84 is dispersed easily within the open area P, such that some portion of the sawdust and/or chips spread in the airflow are not completely propelled into the inlet 852 of the dust collection passage 85 but are dispersed onto the table assembly 81 and into the surrounding areas. The result is a reduction in sawdust collection efficiency and a dirty working space.

SUMMARY

In view of the foregoing, an embodiment of the present invention aims to provide a miter saw incorporating a more efficient sawdust collection system.

Accordingly, a dust collection system is provided for use with a miter saw that comprises a table assembly, a pivot arm, and a saw blade. The table assembly includes a workpiece support surface provided for disposing a workpiece thereon. The pivot arm is pivotally mounted to the table assembly and is capable of pivoting downward toward the table assembly, and includes a driver. A dust collection passage is formed within the pivot arm and is located adjacent to where the pivot arm is pivotally mounted to the table assembly. The saw blade is mounted on the pivot arm and is driven by the driver for cutting the workpiece. When the pivot arm is rotated downward toward the table assembly, the saw blade is conducted to move along a plane. The dust collection system includes a groove. One end of the groove connects with the table assembly and, the other end extends to the dust collection passage. The plane extends into the groove and is substantially parallel to the longitudinal direction of the groove. The dust collection system for a miter saw of the present invention enables the sawdust or chips generated during the cutting operation to be conveyed to the dust collection passage along the groove and discharged out of the miter saw. Whereby, when the miter saw of the present invention performs a workpiece cutting, one end of the groove of the dust collection system connects with the table assembly, and the other end extends to the dust collection passage, so that the groove directs the airflow generated by the rotating saw blade to enter the dust collection passage, and thus improves the dust collection efficiency of the miter saw of the present invention.

DETAILED DESCRIPTION

Figure 1:
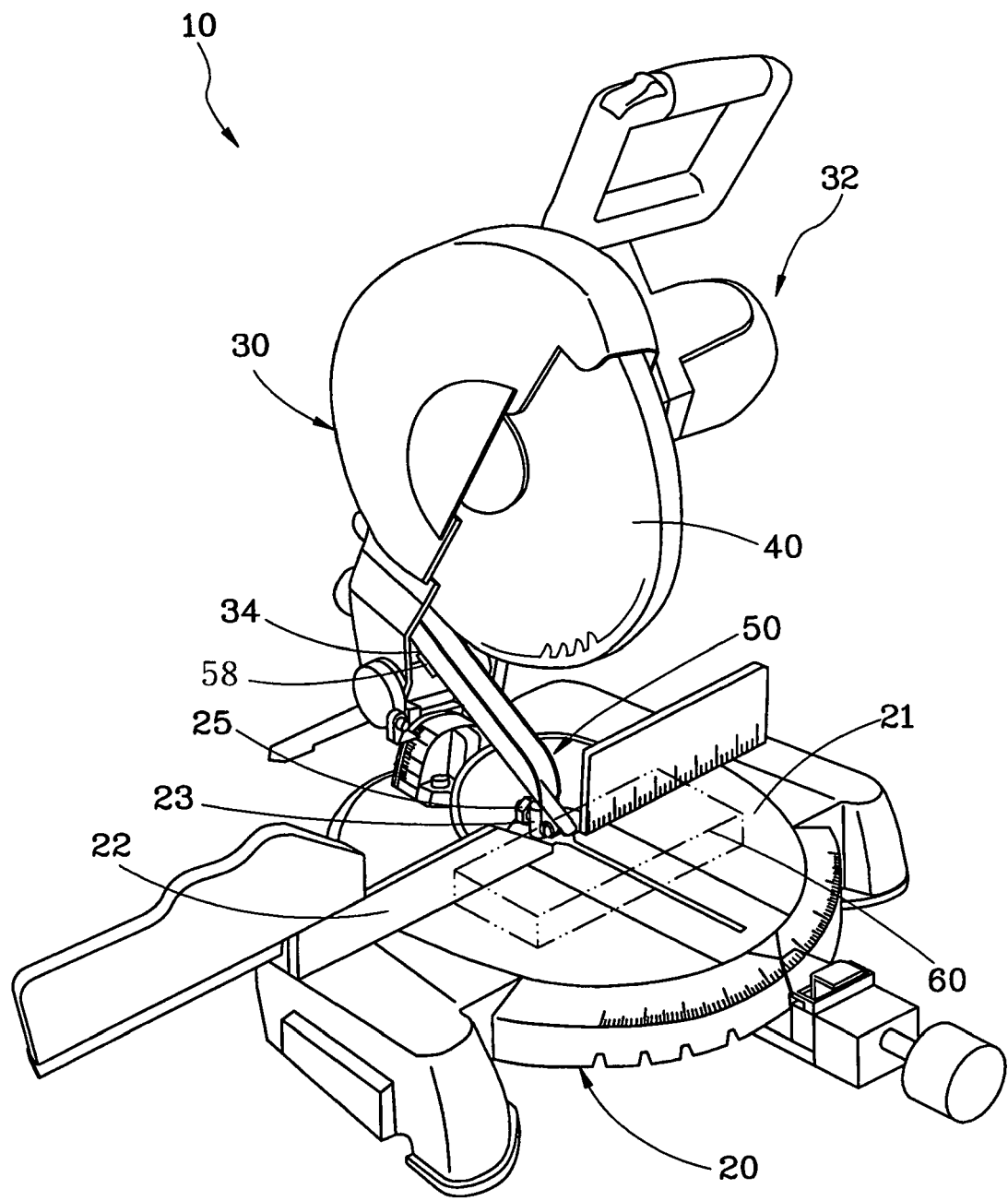
FIG. 1 is a perspective view of a miter saw according to a first embodiment.
Figure 2:
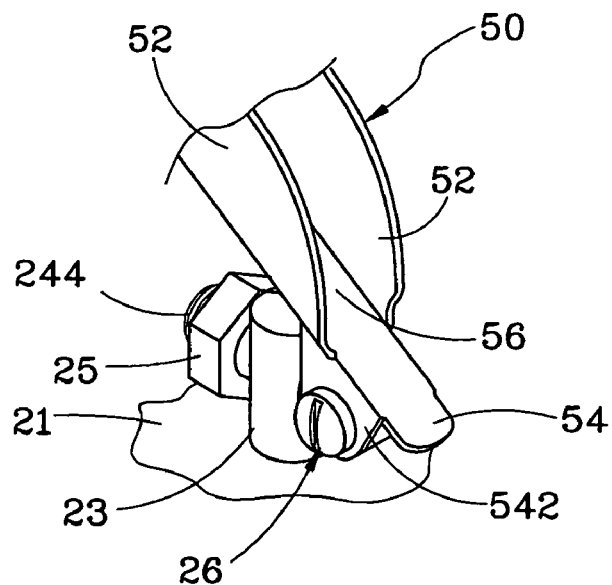
FIG. 2 is an enlarged perspective view in partial section of the miter saw in FIG. 1, detailing the pivotal connection of the dust collection system to the table assembly.
Figure 3:
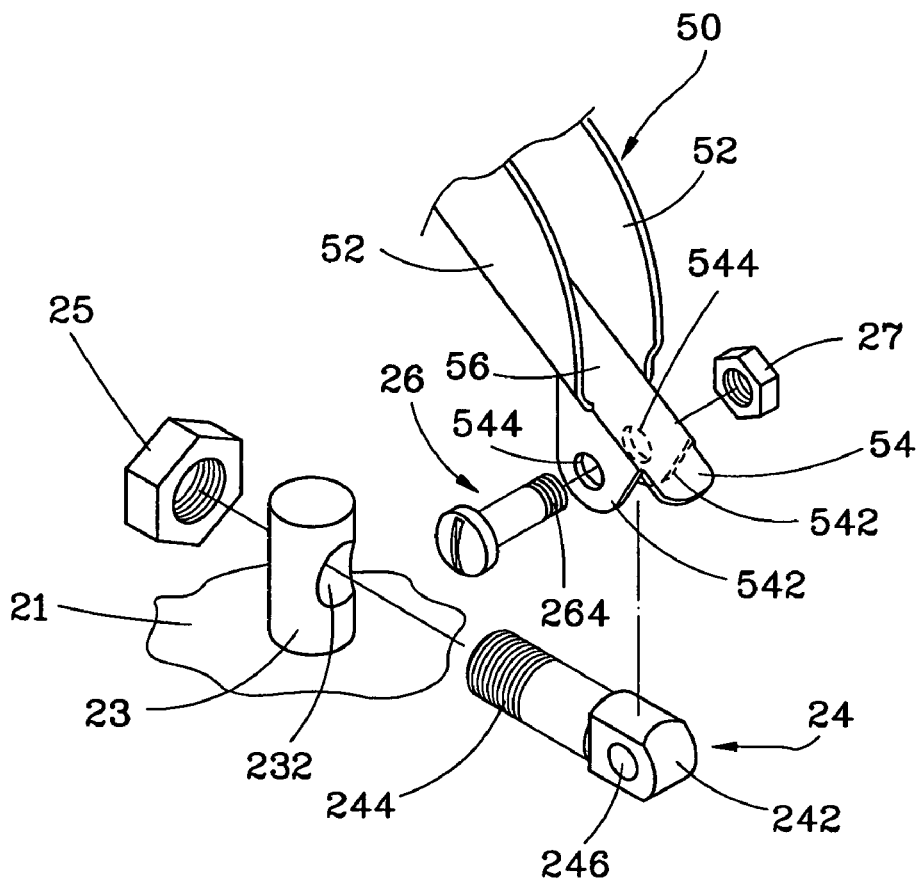
FIG. 3 is an exploded view of the pivotal connection of the dust collection system of FIG. 2.

Referring to FIGS. 1 through 4, a miter saw 10 of a first embodiment is shown in accordance with the present invention. The miter saw 10 includes a table assembly 20, a fence 22, a pivot arm 30, a saw blade 40 and a dust collection system 50.

The table assembly 20 includes a workpiece support surface 21 upon which a workpiece 60 to be cut can be supported. The fence 22 is disposed on the table assembly 20 and is provided for being abutted against by the workpiece 60. The table assembly 20 further includes a rod 23, a second shaft 24, and a first nut 25. The rod 23 is vertically fixed on the table assembly 20 so that a central axis of the rod 23 is perpendicular to the workpiece support surface 21. A hole 232 is bored through the rod 23, substantially perpendicular to the central axis of the rod 23. The second shaft 24 is substantially parallel to the workpiece support surface 21, and has a head part 242 having at least two opposed substantially planar side surfaces, and a body part 244. An aperture 246 is bored through the head part 242. The body part 244 is inserted through the hole 232 of the rod 23 and is rotatable in the hole 232. The end of body part 244 opposed to the head part 242 is threaded. The first nut 25 is screwed onto the end of body part 244 of the second shaft 24 such that the body part 244 of the second shaft 24 cannot be removed from the hole 232. The table assembly 20 further includes a first shaft 26 and a second nut 27. The first shaft 26 has a body part 264, and an end of body part is threaded. The second nut 27 can be screwed onto the end of body part 264 of the first shaft 26.

One end of the pivot arm 30 is pivotally mounted to the table assembly 20, so that the pivot arm 30 is pivotable downward toward the table assembly 20. The pivot arm 30 includes a driver 32, which is a motor in the present embodiment. A dust collection passage 34 is formed within the pivot arm 30 and is located adjacent to where the pivot arm 30 is pivotally mounted to the table assembly 20.

The saw blade 40 is mounted to the pivot arm 30 and connected with the driver 32. The saw blade 40 is driven by the driver 32 to rotate. When the pivot arm 30 is rotated downward toward the workpiece support surface 21, the saw blade 40 will be conducted to move downward toward the workpiece support surface 21 along a plane for cutting the workpiece 60.

The dust collection system 50 includes two side walls 52 and a bottom wall 54, wherein the two top lines of the two side walls 52 are generally shaped like arcs and the bottom lines of the two side walls 52 interconnect respectively with the two side lines of the bottom wall 54, such that a groove 56 is formed between the two side walls 52 and the bottom wall 54. The cutting plane of the saw blade 40 extends into the groove 56 and is substantially parallel to a longitudinal axis of the groove 56. One end of the bottom wall 54 extends to the dust collection passage 34 and leans against the pivot arm 30. Two ears 542 (one ear is also workable) are formed and extend toward the table assembly 20 from the bottom of the other end of the bottom wall 54. The two opposed side surfaces of the head part 242 of the second shaft 24 fit in-between the two ears 542. The two ears 542 are bored through with a pair of openings 544 respectively which correspond to the aperture 246 in the head part 242 of the second shaft 24. The first shaft 26 is inserted through the openings 544 and the aperture 246, and the second nut 27 is screwed onto the end of body part 264 of the first shaft 26 such that the second shaft 24 and the dust collection system 50 are interconnected together, and the dust collection assembly 50 is pivotable downward toward the workpiece support surface 21 by having the first shaft 26 as a pivot and is further positioned at the rear portion of the table assembly 20 without extending beyond the contacted surface of the workpiece 60 abutted against the fence 22.

Figure 4:
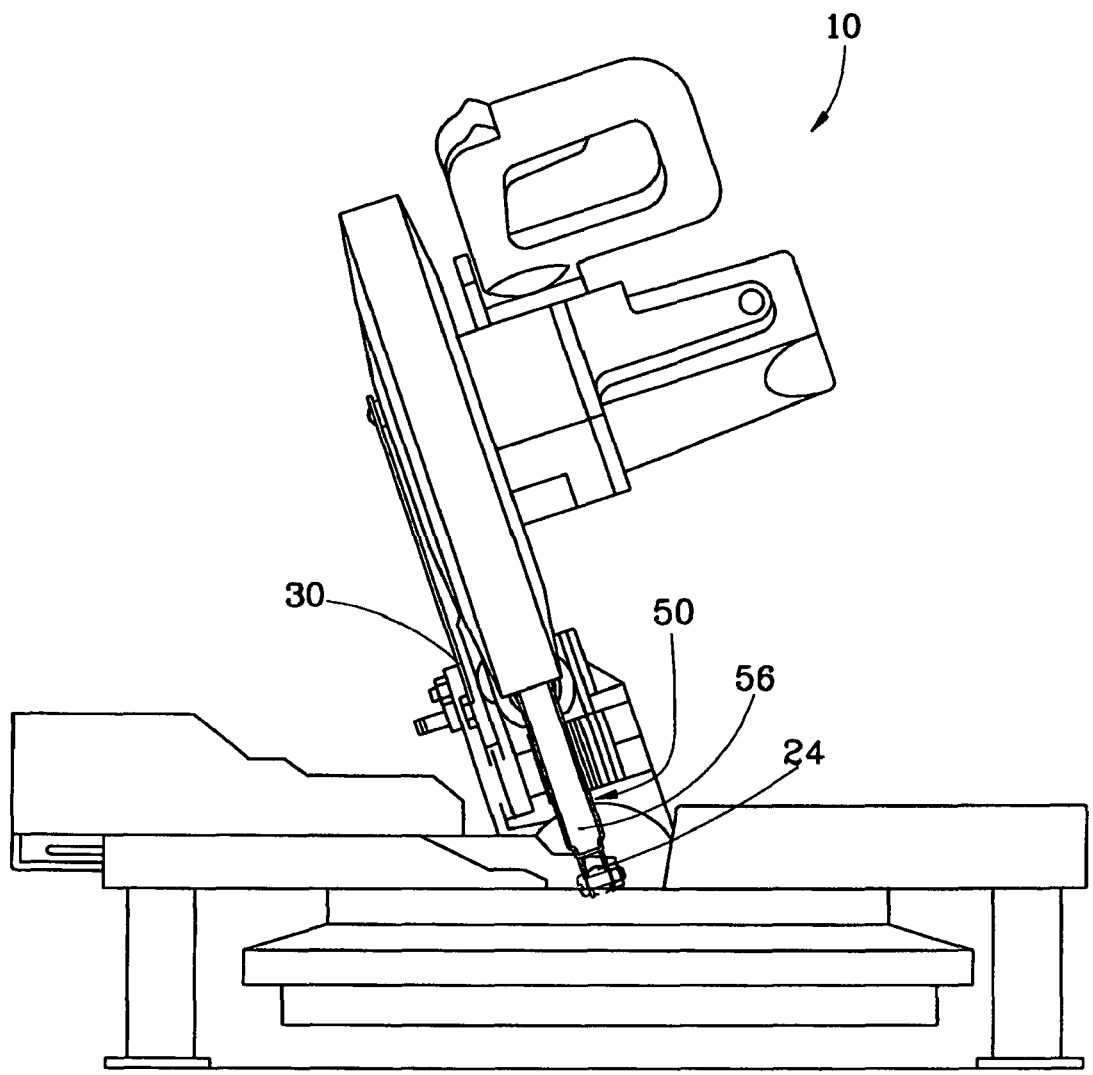
FIG. 4 is a perspective view of a miter saw of the first embodiment, showing the dust collection system and the miter saw are positioned at a left bevel angle.

Through the above-mentioned structure, when a user wants to make a cut on the workpiece 60, the user empowers the driver 32 to drive the saw blade 40 to rotate for cutting the workpiece 60. Since one end of the groove 56 connects with the table assembly 20 and the other end extends to the dust collection passage 34 and is also located between a tangent line position of the saw blade 40 rotating out of the workpiece 60 and the dust collection passage 34, the sawdust produced during the cutting operation is conducted by the centrifugal force and the airflow generated by the rotating saw blade 40 into the groove 56, and enters the dust collection passage 34 along the groove 56 and is finally discharged out of the miter saw 10. When the miter saw 10 makes a bevel cut as shown in FIG. 4, one of the side walls 52 of the dust collection system 50 is engaged and pushed by the pivot arm 30, thus making the dust collection system 50 follow the pivot arm 30 to deflect via the rotation of the second shaft 24, such that the sawdust can also be continuously conducted into the dust collection passage 34 along the groove 56. Additionally, the dust collection system 50 can also be provided with a cushion (58) underneath the bottom wall 54 between the bottom wall 54 and the dust collection passage 34. The cushion can be made of polyurethane or rubber or other soft materials for absorbing the shock when the bottom wall 50 leans against the pivot arm 30.

Figure 5:
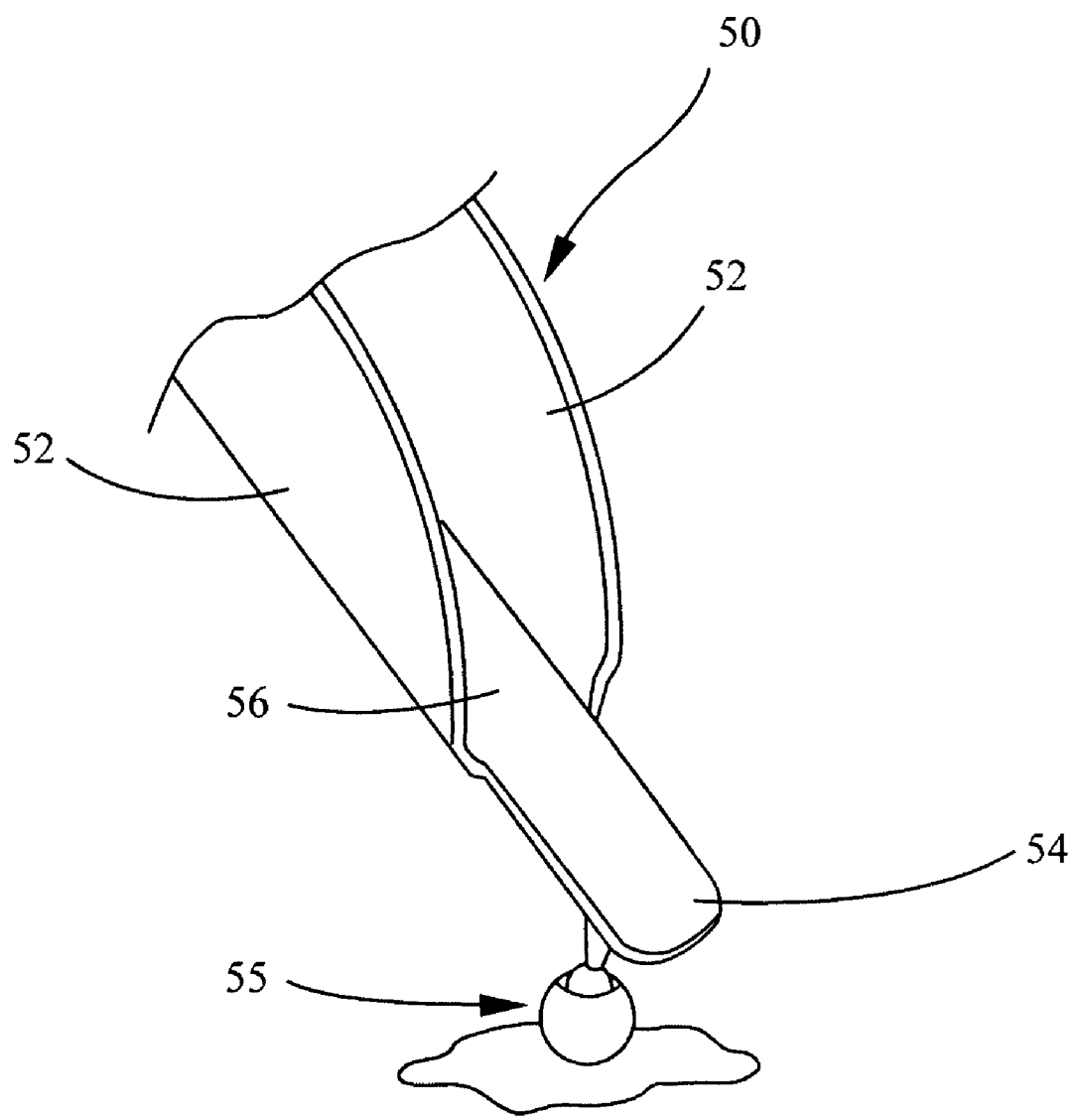
FIG. 5 is a perspective view in partial section showing a variation of the pivotal connection of the dust collection system.

In view of the above discussion, the dust collection system 50 of present invention can be pushed by the pivot arm 30 to pivot or deflect relative to the table assembly 20 by the means of interconnecting the second shaft 24, the first shaft 26 and the table assembly 20. There are still many other means of interconnection, such as interconnecting the groove 56 and the table assembly 20 via a universal joint 55, for example as shown in FIG. 5. No matter at what angle of cutting, the dust collection system 50 can be rotated accordingly, furthermore, one end of the dust collection system 50 connects with the table assembly 20, and the other end extends to the dust collection passage 34, so that the airflow generated by the rotating saw blade 40 is conducted into the dust collection passage 34 smoothly to improve the dust collection efficiency of the miter saw 10.

Figure 6:
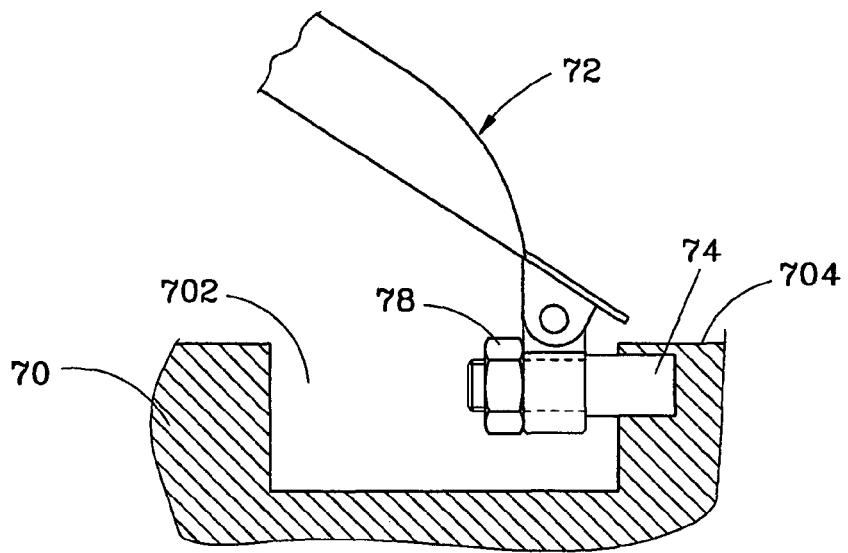
FIG. 6 is a perspective view in partial section of a miter saw according to a second embodiment.
Figure 7:
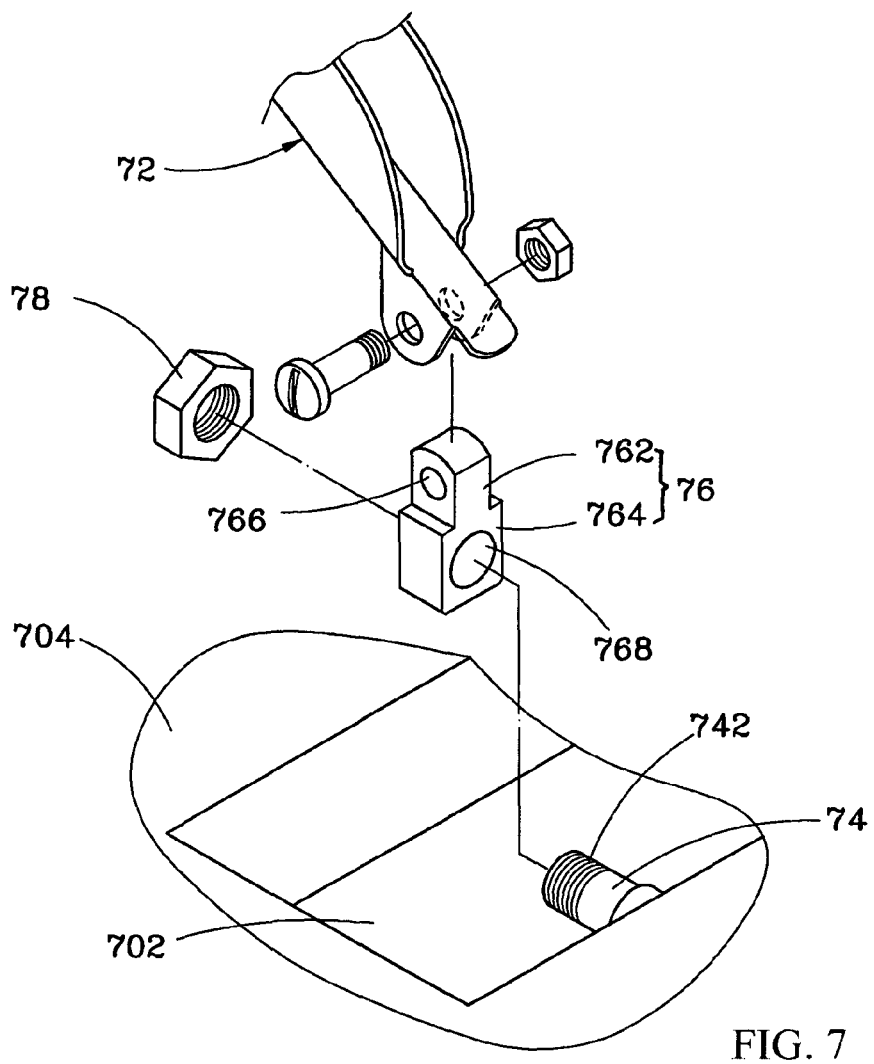
FIG. 7 is an exploded view of the second embodiment.
Figure 8:
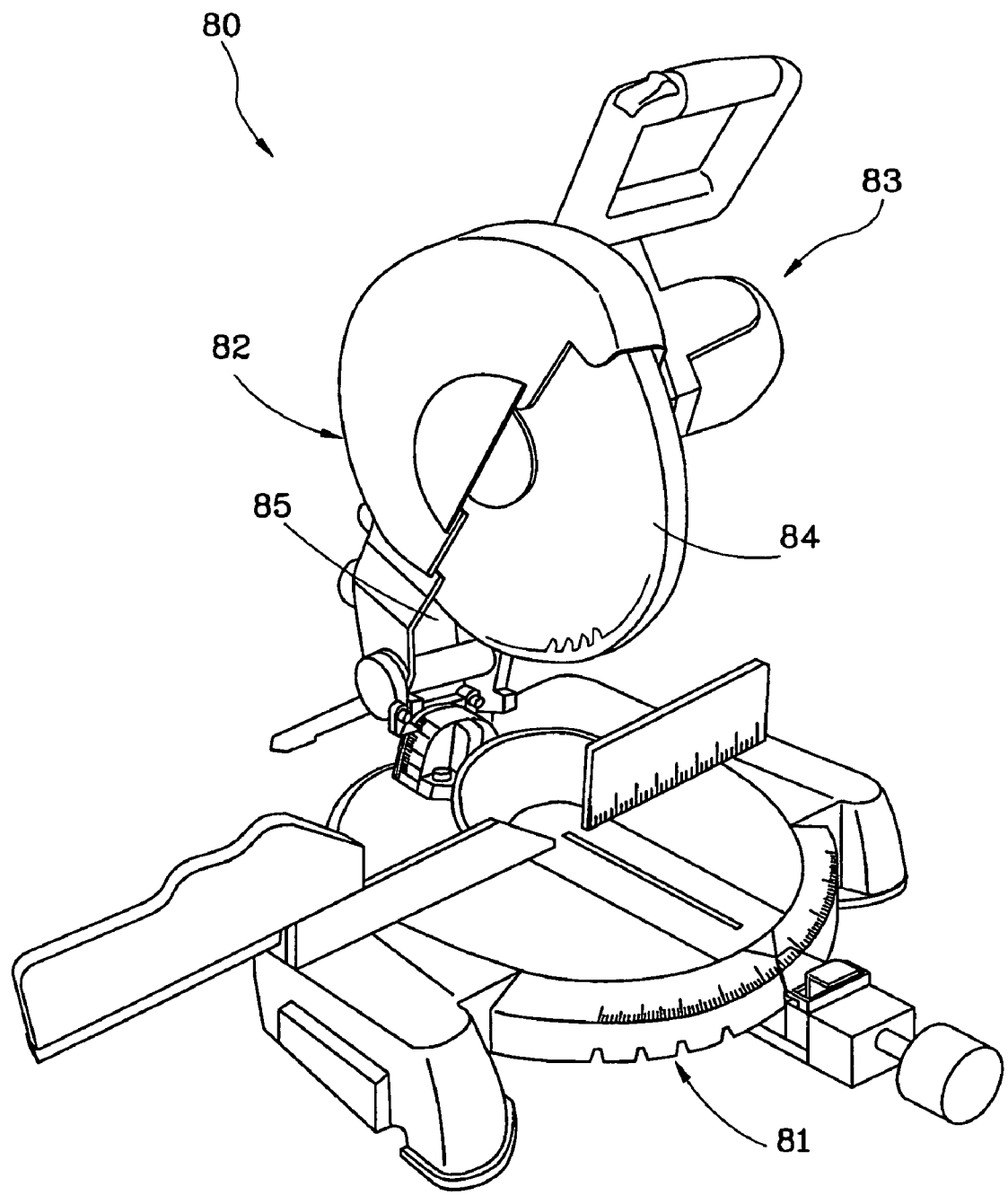
FIG. 8 is a perspective view of a miter saw in accordance with the prior art.
Figure 9:
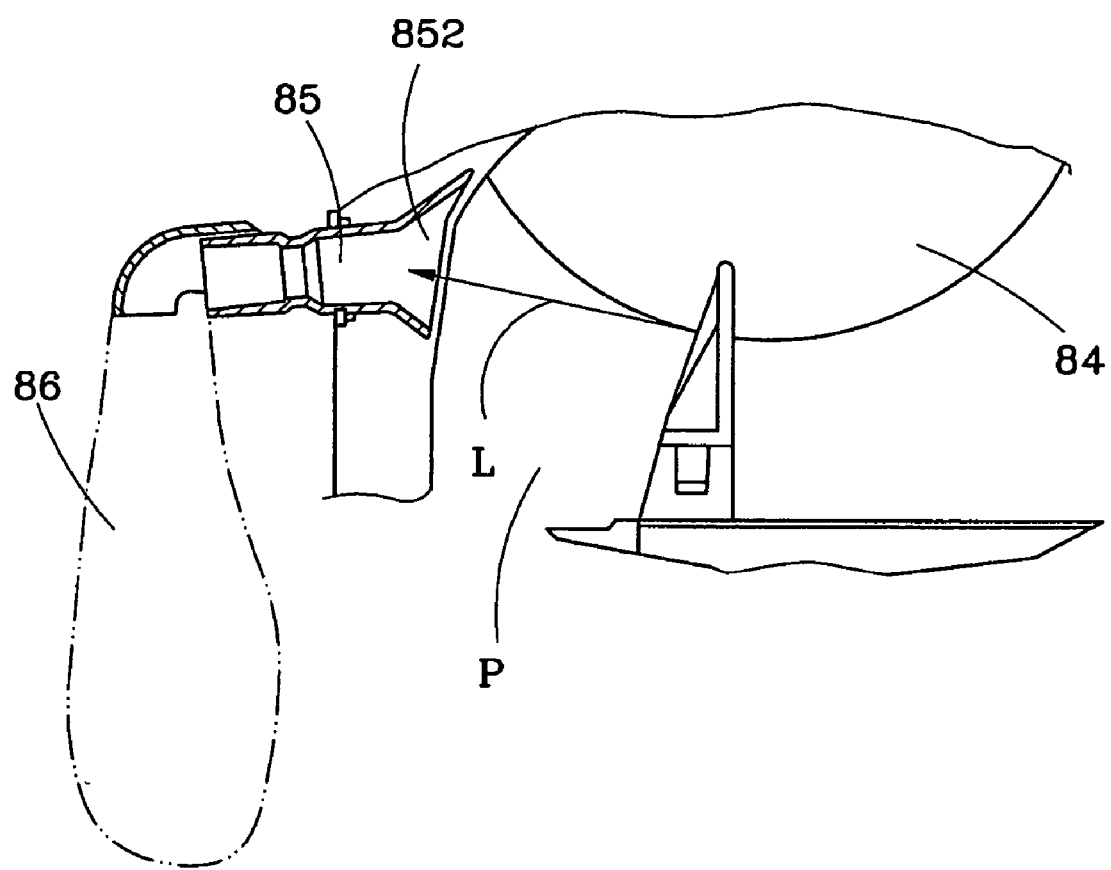
FIG. 9 is an enlarged perspective view in partial section of the miter saw in FIG. 8, showing the relationship between the tangent line direction of the saw blade and dust collection passage when the miter saw makes a cutting operation.

A second embodiment in accordance with the present invention is shown in FIGS. 6 and 7. The structure provided by the second embodiment is similar to the first embodiment; the differences are illustrated as below. A table assembly 70 has a recess 702. One end of a rod 74 is fixed transversely vertically on an interior wall of the recess 702, and the other end has a body part 742. The end of body part 742 is threaded. A second shaft 76 includes a head part 762 and a body part 764. The head part 762 is bored through with an aperture 766, and the body part 764 is bored through with a hole 768 that is perpendicular to the direction of the aperture 766. The rod 74 is inserted through the hole 768, such that the second shaft 76 is pivotable on the rod 74, and is positioned in the recess 702. A first nut 78 is screwed onto the end of body part 742 of the rod 74, so that the body part 742 of the rod 74 is unable to be removed from the hole 768.

The interconnection structure of a dust collection system 72 and the second shaft 76 is the same as the first embodiment. The portion of interconnection is raised from the recess 702 and is higher than a workpiece support surface 704. Accordingly, the dust collection system 72 of the second embodiment can also be pushed by a pivot arm to rotate and deflect relative to the table assembly 70 according to the present embodiment.

The foregoing discussion discloses and describes merely exemplary embodiments of the present invention for purposes of illustration only. One skilled in the art will readily recognize from such discussion, and from the accompanying drawings and claims, that various changes, modifications, and variations may be made therein without departing from the spirit and scope of the invention as defined in the following claims.

What is claimed is:

1. A saw having a dust collection assembly comprising:
   a table assembly including a workpiece support surface configured to support a workpiece during cutting;
   a pivot arm pivotally mounted to rotate downward toward said table assembly along a cutting plane, said pivot arm including a driver and a dust collection passage formed at a location adjacent to where said pivot arm is pivotally mounted to said table assembly;
   a saw blade mounted to said pivot arm and configured to be driven by said driver for cutting along the cutting plane; and
   a dust collection system having a groove for collecting dust forming a longitudinal axis, a first end having a pivotal connection to said table assembly at the workpiece support surface, and a second end extending to said dust collection passage, said cutting plane extending into said groove and being substantially parallel to the groove longitudinal axis;
   the pivotal connection between the first end and the table assembly having at least a first and a second axis, where the first axis is perpendicular to the second axis;

wherein the dust collection system can be pushed by the pivot arm to pivot with the saw blade about the first axis during miter cutting of a workpiece and about the second axis prior to bevel cutting of a workpiece so that the cutting plane extends into the groove during both miter and bevel cutting.

2. The saw according to claim 1, wherein said pivotal connection includes a first shaft, and said dust collection system has at least one ear extending therefrom, said at least one ear forming an opening, and said first shaft inserted through the opening of said ear.

3. The saw according to claim 2, wherein said pivotal connection further includes a second shaft substantially vertically connecting to said first shaft.

4. The saw according to claim 3, wherein said second shaft forms an aperture, and said first shaft is inserted through said aperture.

5. The saw according to claim 3, wherein said pivotal connection further includes a rod substantially vertically connecting to said second shaft.

6. The saw according to claim 5, wherein said rod forms a hole, and said second shaft is inserted through said hole.

7. The saw according to claim 5, wherein a central axis of said rod is substantially perpendicular to said workpiece support surface.

8. The saw according to claim 7, wherein said rod stands on said table assembly.

9. The saw according to claim 8, further comprising a fence disposed across said workpiece support surface and having a contact surface configured for being abutted against by a workpiece, wherein said dust collection system is positioned in a rear part of said table assembly and does not extend beyond the contact surface of said fence.

10. The saw according to claim 1, wherein said dust collection system further has a cushion disposed under said groove and upon a bottom wall of said dust collection passage.

11. The saw according to claim 1, wherein said pivotal connection further includes a universal joint connected with said dust collection system.

12. A saw comprising:
a table assembly including a workpiece support surface configured to support a workpiece during cutting;
a pivot arm pivotally mounted to rotate downward toward said table assembly along a cutting plane, said pivot arm having a driver and a dust collection passage formed in a location adjacent to where said pivot arm is pivotally mounted to said table assembly;
a saw blade mounted to said pivot arm, and configured to be driven by said driver for cutting along the cutting plane; and
a dust collection system having a groove for collecting dust forming a longitudinal axis, a first end having a pivotal connection to said table assembly at the workpiece support surface, and a second end extending to said dust collection passage, said cutting plane extending into said groove and being substantially parallel to the groove longitudinal axis;
the pivotal connection between the first end and the table assembly having a first shaft and a second shaft respectively defining a first and a second axis, where the first axis is perpendicular to the second axis;
wherein the dust collection system can be pushed by the pivot arm to pivot with the saw blade about the first axis during miter cutting of a workpiece and about the second axis prior to bevel cutting of a workpiece so that the cutting plane extends into the groove during both miter and bevel cutting.

13. The saw according to claim 12, wherein said pivotal connection further includes a rod substantially vertically connecting to said second shaft.

14. The saw according to claim 13, wherein a central axis of said rod is substantially perpendicular to said workpiece support surface.

15. A saw comprising:
a table assembly including a workpiece support surface configured to support a workpiece during cutting;
a pivot arm pivotally mounted to rotate downward toward said table assembly along a cutting plane, said pivot arm having a driver and a dust collection passage formed at a location adjacent to where said pivot arm is pivotally mounted to said table assembly;
a saw blade mounted to said pivot arm and configured to be driven by said driver for cutting along the cutting plane;
a dust collection system having a groove for collecting dust forming a longitudinal axis, a first end having a pivotal connection to said table assembly at the workpiece support surface, and a second end extending to said dust collection passage, said cutting plane extending into said groove and being substantially parallel to the groove longitudinal axis;
the pivotal connection between the first end and the table assembly having at least a first and a second axis, where the first axis is perpendicular to the second axis;
wherein the dust collection system can be pushed by the pivot arm to pivot with the saw blade about the first axis during miter cutting of a workpiece and about the second axis prior to bevel cutting of a workpiece so that the cutting plane extends into the groove during both miter and bevel cutting; and
a fence disposed across said workpiece support surface and having a contact surface configured for being abutted against by a workpiece, wherein said dust collection system is positioned in a rear part of said table assembly and does not extend beyond the contact surface of said fence.

16. The saw according to claim 15, wherein said pivotal connection further includes a first shaft and a second shaft, said first shaft pivotally connected with said dust collection system and substantially vertically connected with said second shaft.

17. The saw according to claim 16, wherein said pivotal connection further includes a rod substantially vertically connecting to said second shaft.

18. The saw according to claim 17, wherein a central axis of said rod is substantially perpendicular to said workpiece support surface.

19. The saw according to claim 15, wherein said dust collection system further includes a cushion disposed under said groove and upon a bottom wall of said dust collection passage.

20. The saw according to claim 15, wherein said pivotal connection further includes a universal joint connecting to said dust collection system.

* * * * *